F. J. BOSEK.
EMERGENCY BRAKE.
APPLICATION FILED JULY 5, 1918.

1,304,254.

Patented May 20, 1919.

WITNESSES
Geo. N. Naylor
C. Bradway

INVENTOR
F. J. Bosek
BY
ATTORNEYS

UNITED STATES PATENT OFFICE.

FRANK J. BOSEK, OF GALETON, PENNSYLVANIA.

EMERGENCY-BRAKE.

1,304,254.  Specification of Letters Patent.  Patented May 20, 1919.

Application filed July 5, 1918. Serial No. 243,396.

*To all whom it may concern:*

Be it known that I, FRANK J. BOSEK, a citizen of the United States, and a resident of Galeton, in the county of Potter and State of Pennsylvania, have invented a new and Improved Emergency-Brake, of which the following is a full, clear, and exact description.

This invention relates to a brake device especially adapted for Ford cars, and it has for its general objects to provide a substitute brake construction whereby the brake band will engage externally the brake drum so as to secure greater reliability and holding power, there being a novel supporting means which is applied to the stationary disk associated with the brake drum for holding the brake band and the toggle device for contracting the brake band into frictional engagement with the drum.

Still another object of the invention is to provide simple, novel and effective means for holding the brake band normally out of engagement with the drum at all points.

With such and other objects in view, the invention comprises various novel features of construction and arrangement of parts which will be set forth with particularity in the following description and claims appended hereto.

Figure 1:
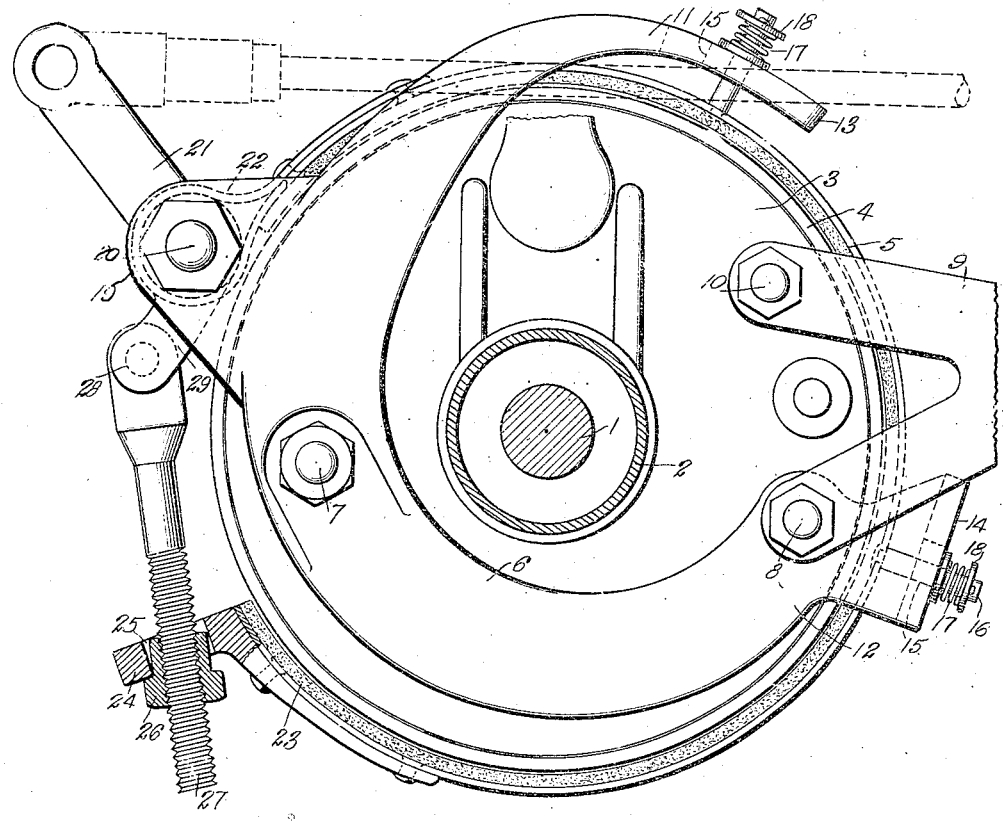
Figure 2:
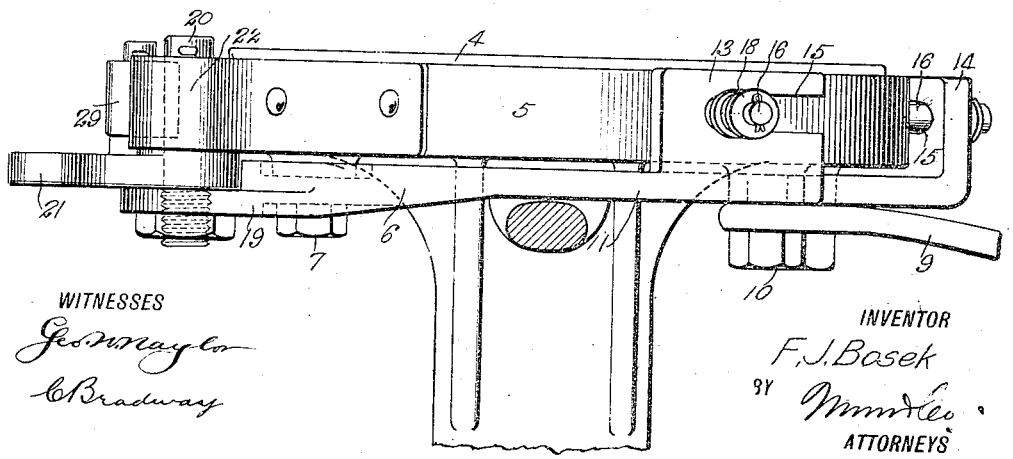

In the accompanying drawing, which illustrates one embodiment of the invention and wherein similar characters of reference indicate corresponding parts in both the views, Figure 1 is a side view of the brake; and Fig. 2 is a plan view thereof.

Referring to the drawing, 1 designates the axle, 2 the tube incasing the same and on which is mounted the usual stationary brake band supporting plate, and associated with the plate 3 is the brake drum 4. On a Ford car the brake band is adapted to engage the brake drum 4 internally, but in the present instance the brake band 5 is shown on the outside of the drum so as to engage it externally. By arranging the band in this manner a special supporting structure 6 is provided. This is an approximately crescent-shaped frame which is secured to the plate 3 by bolts 7 and 8, the latter of which serves to attach the radius rod 9 to the plate 3, there being an additional bolt 10 to secure the radius rod to the plate. The extremities 11 and 12 of the frame member 6 have laterally extending lugs 13 and 14, respectively, each of which is provided with a slot 15 through which extends a pin 16. The inner end of the pin is attached to the brake band 5, and on the pin is a spring 17 bearing against an abutment 18 formed by a washer, whereby the spring tends to urge the pin outwardly away from the axle, so that the brake band is normally held at a plurality of spaced points away from the brake drum.

The central portion of the supporting member 6 has an outwardly extending lug 19 which carries a pivot 20 on which is fulcrumed an operating lever 21, and around this pivot is fastened the eye 22 on one end of the brake band, whereby such band is held against movement. The opposite end 23 of the brake band is provided with an ear 24 having an aperture 25, and engaging this aperture is an adjustable abutment in the form of a nut 26 threaded on a toggle link member 27. The member 27 is pivotally connected at 28 with the other toggle link member formed by the arm 29 of the lever 21. The nut 26 serves as an adjustable connection for lengthening or shortening the toggle link so as to vary the frictional grip of the brake band on the drum, and also serves to prevent the threads of the member 27 from wearing.

The lever 21 will be connected with the emergency operating lever which, when in off position, will hold the free ends of the brake band disengaged from the drum, but when the operating lever is actuated the ends of the brake bands are drawn together by the toggle device 27, 29, and the springs 17 will permit the brake band to move inwardly, and consequently the drum will be gripped uniformly at all points. When the operating lever is released the brake band will automatically open and disengage the drum.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a brake drum, a band surrounding the same, a frame supported from a point within the drum and having extremities extending over the band, means for yieldingly attaching the band to the extremities of the frame, and means mounted on the frame at an intermediate point for expanding and contracting the brake band.

2. The combination of a brake drum, a stationary plate associated with the drum, a frame fastened to the plate and having slotted extremities overlying the drum, a brake band surrounding the drum, pins on the brake band and extending through the slotted extremities of the frame, springs on the pins for holding the brake band released from the drum, and means on the frame and connected with the ends of the brake band to expand or contract the latter.

3. The combination of a brake drum, a band surrounding the drum and having an eye at one end and a lug at its other end, a crescent shaped frame supported from a point within the drum and having its ends extending over the band and yieldingly connected therewith, said frame being provided with an outwardly projecting lug intermediate of its ends, a bell crank lever pivoted to lug and around the pivot of which passes the eye of the band, and a member having one end pivoted to a member of the bell crank lever and its other end adjustably secured to the lug of the band.

FRANK J. BOSEK.